Sept. 16, 1941.  L. A. BIXBY ET AL  2,256,308
SYNCHRONIZING MEANS
Filed Oct. 7, 1939
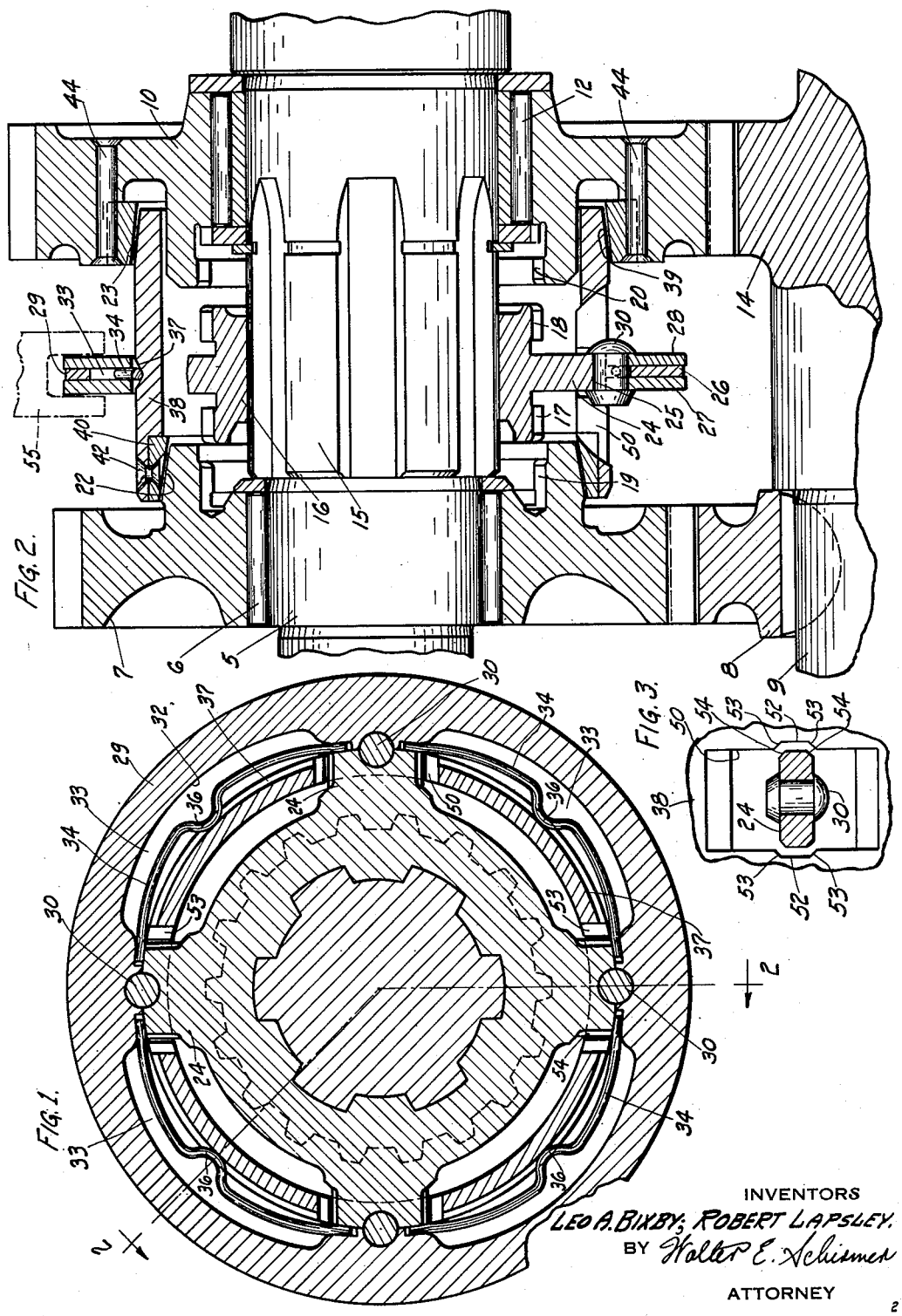
INVENTORS
LEO A. BIXBY; ROBERT LAPSLEY.
BY Walter E. Schiemer
ATTORNEY Patented Sept. 16, 1941

2,256,308

UNITED STATES PATENT OFFICE 2,256,308

SYNCHRONIZING MEANS

Leo A. Bixby and Robert Lapsley, Berrien Springs, Mich., assignors to Clark Equipment Company, Buchanan, Mich., a corporation of Michigan Application October 7, 1939, Serial No. 298,391

15 Claims. (Cl. 192—53)

This invention primarily is directed to an improved construction of synchronizer assembly especially adapted for use in change speed transmissions of the type used in the automotive industry.

In recent years it has become increasingly prevalent to employ means for synchronizing the speeds of the engageable gear members in a change speed transmission prior to effecting clutching or meshing engagement therebetween in order to avoid clashing of gears and to render the transmission substantially silent in operation. Such synchronizing means have, in the main, been satisfactory so far as the intended purpose is concerned but have been relatively expensive to manufacture and install, and also have materially increased the weight of the structure due to the necessity of providing a synchronizer that would be substantial enough to take the stresses imposed thereon.

One form of synchronizer which has heretofore been in use comprises a clutch gear having axially spaced clutch tooth portions and which is axially slidable in opposite directions on a splined shaft to selectively clutch axially spaced gears to the shaft, the gears having corresponding clutch tooth portions. Associated with each of the gears is an inclined surface of frusto-conical form with the clutch gear carrying thereon a synchronizer sleeve or the like having corresponding friction surfaces adapted to engage the gear friction surfaces to bring the sleeve and gear into substantial synchronous rotation prior to engagement of the positive clutch tooth portions therebetween. Such synchronizers are of two general types, the non-blocking type in which, by added shifting pressure, the clutch tooth portions can be engaged even though no synchronism of rotation between the gears has been effected, and the blocking type in which it is necessary that substantial synchronism be obtained before positive clutching can be effected.

The present invention has for one of its primary objects the provision of a blocking type synchronizer which is designed with a view toward economical manufacture and assembly, while yet retaining the desirable characteristics of ruggedness and strength essential to absorb the stresses produced in such mechanisms.

Another object of the present invention is to eliminate the ball and spring type of connection between the synchronizing sleeve and the clutch gear, and to remove the pin connection from the clutch gear to the shifter yoke which is engaged by the shift fork of the transmission.

A still further feature of the present invention is to provide a synchronizer sleeve mounted for floating movement with respect to the clutch gear by means of small wire springs engaging in detents formed in the synchronizer surface with the clutch gear having a plurality of extending fingers to which are secured suitable means forming a housing for the wire springs, and also serving as a means for engagement by the shifter fork.

Still another feature of the present invention is to provide for the use of rivets to connect the clutch gear and the shifter yoke, these rivets extending axially through the yoke and fingers of the clutch gear intermediate adjacent wire springs.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is a vertical sectional view through a synchronizer employing the present invention;

Figure 2 is a sectional view taken substantially on line 2—2 of Figure 1; and

Figure 3 is a plan view of a portion of the synchronizer mechanism.

Referring now in detail to the drawing, a portion of the transmission is indicated generally in Figure 2 comprising a main transmission shaft 5 upon which is mounted by means of the roller bearings 6 a change speed gear 7, this gear having constant meshing engagement with a gear 8 keyed to the countershaft 9. Spaced axially on the shaft 5 from the gear 7 is a second gear 10 mounted upon the bearings 12 and having constant meshing engagement with the gear portion 14 formed on the countershaft 9. Intermediate the gears 7 and 10 the main shaft 5 is provided with a splined portion 15 upon which is mounted in splined relation the clutch gear 16. The clutch gear 16 is provided with the clutch tooth portions 17 and 18 adapted, upon axial shifting thereof, to have meshing engagement with the overhanging clutch tooth portions 19 and 20, respectively, of the gears 7 and 8.

The gear 7 is also provided with the frusto-conical surface 22 disposed radially outwardly of the clutch tooth portion 19, while the gear 10 is provided with a corresponding internal frusto-conical surface 23 radially spaced from the clutch tooth portion 20.

The clutch gear 16 is provided with a plurality of radially extending fingers or arms 24, these arms terminating at their outer ends in arcuate surfaces having intermediate semi-circular notches 25 formed therein. Encircling the clutch gear 16 and disposed in radial alinement with the arms 24 is a clutch yoke portion, indicated generally at 26, this portion comprising two substantially similar washers 27 and 28 spaced apart by an intermediate washer 29, the three washers being held together as a rigid unit by means of transverse rivets 30 which extend between the washer assembly 26 and the arms 24 and non-rotatably lock the washers to the arms by reason of the semi-cylindrical bearing of the rivets 30 in the ends of the arms 24 and in the washers 27, 28 and 29.

The washer 29 differs from the associated washers 27 and 28 in having the radial inner edge thereof intermediate the arms 24 recessed or relieved as indicated at 32 to provide a housing or chamber 33 between the washers 27 and 28 intermediate the arms 24.

Disposed in the chambers 33 are wire spring members 34 which at opposite ends overlie the adjacent ends of the arms 24 and are secured against lateral movement by the lateral bearing engagement against the adjacent faces of the washers 27 and 28.

Intermediate their ends the springs 34 are provided with radially inwardly struck portions 36 which are adapted to engage in suitable notched out surfaces 37 formed in the synchronizer sleeve 38.

This sleeve 38 comprises an essentially cylindrical body portion terminating at one end in an external frusto-conical surface 39 and at the opposite end having the friction ring 40 of frusto-conical form riveted thereto as by the rivets 42. The member 40 is adapted to have frictional contact with the frusto-conical surface 22 of the gear 7 while the external surface 39 at the opposite end of the sleeve is adapted to have contact with the friction surface of the member 23 carried on the gear 10 by means of the rivets 44.

The sleeve 38 is provided with cut out, substantially rectangular recessed portions 50 receiving the arms 24 of the clutch gear 16 and intermediate the respective cut out portions 50 the sleeve has the depressed detent surface 37 formed therein extending circumferentially and adapted to receive the radially instruck portions 36 of the springs 34. It will therefore be apparent that the sleeve 38 is prevented from relative movement with respect to the washer assembly 26, and consequently with respect to the gear 16 by the engagement of the springs 34 in the detents 37. However, it will be noted that upon a very slight amount of movement of the yoke assembly 26 in either direction, the sleeve 38 will be carried therewith to provide frictional contact with the frusto-conical surfaces on the gears 7 or 10, and consequently will tend to produce synchronous rotation of the sleeve 38 with respect to the particular gear with which it is engaged.

The recesses 50 in the sleeve 38 have formed intermediate their ends oppositely extending recesses 52 defined by angular shoulders 53. The arms 24 of the clutch gear have similar angularly formed shoulders 54. When the yoke assembly 26 is shifted axially, as by means of a shifter fork indicated diagrammatically at 55, the sleeve 38 is carried into engagement with the associated gear, and there is a tendency to rotate the sleeve 38 at the same speed of rotation as the engaged gear. This results in moving the sleeve 38 circumferentially relative to the arms 24, thereby moving the shouldered portions 54 of the arms 24 into the recesses 52, thereby blocking relative axial movement of the clutch gear 16 relative to the synchronizer sleeve.

So long as the rotation of gear 7, for example when the synchronizer sleeve is moved into frictional engagement with the surface 22 thereof, differs from the speed of rotation of the shaft 5 carrying the gear 16, the arms 24 of the clutch gear 16 will be disposed in either one or the other of the recesses 52, depending upon the relative rotation of the two gears. The contact pressure between the shoulders 53 and 54 under such conditions will prevent the gear 16 from being moved toward clutching engagement of the clutch tooth portions thereof with the clutch teeth 19 of the gear 7, and consequently a blocking action is produced preventing positive clutching engagement.

As the sleeve 38 and gear 7 move into substantially synchronous speed, the contact pressure between shoulders 53 and 54 is relieved and the arm portions 24 of the clutch gear 16 again float in the main recesses 50 of the synchronizer sleeve. Under such conditions, additional pressure on the shifter fork 55 will result in moving the yoke assembly 26 relative to the sleeve 38 forcing the springs 34 out of the detent surface 37, and the gear 16 can move axially relative to the synchronizer sleeve being carried by the yoke assembly 26 to move the clutch teeth 17 into meshing engagement with the clutch teeth 19. Inasmuch as at this time the gear 16 and the gear 7 are rotating at substantially synchronous speed, the possibility of clashing of the clutch teeth portions during meshing engagement is eliminated and a smooth silent shift into clutching engagement can be produced.

Similarly, when the clutch gear is to be clutched to the gear 10 the shifter fork 55 first moves the yoke assembly 26 and the synchronizer sleeve 38 to the right as viewed in Figure 2 until frictional contact is effected between the surfaces 23 and 39. As this occurs, there is a tendency of the sleeve 38 to rotate at a different speed than the clutch gear 16, and consequently the arm portions 24 thereof move circumferentially into the recesses 52 and because of this continuing difference in relative rotation, the contact pressure between shoulders 53 and 54 prevents movement of the gear 16 into meshing engagement. However, as the sleeve 38 and gear 10 assumes synchronous speed, this contact pressure is relieved and the arm 24 can then be moved into the main recess 50 of the sleeve 38 and in this position only the pressure of springs 34 need be overcome to effect shifting movement of the clutch gear 16 into meshing engagement with the gear tooth portion 20 of the gear 10.

It is obvious that the gear 10 may be provided with a surface corresponding to the surface 22 of the gear 7, and that the opposite end of the sleeve 38 in such a construction will be formed identical with the end carrying the member 40. In fact, it is contemplated that within the scope of the present invention the sleeve 38 may be either of the form shown or of a form having two external frusto-conical surfaces at opposite ends or two internal frusto-conical surfaces at opposite ends without in any way affecting the underlying features of the invention. The external frusto-conical form of sleeve is shown in Patent No. 2,174,148 of September 26, 1939, to Vincent, while the internal form of the construction is shown in Patent No. 2,131,199 of September 27, 1938 to Tenney.

It is also apparent that by the use of the yoke assembly 26 comprising the three washer members a considerable amount of machining is eliminated, and consequently the assembly can be manufactured much cheaper than those heretofore in use. Also, the use of the wire springs 34 retained in the housing formed by the yoke assembly provides a much simpler, more compact assembly than with the use of spring pressed ball detents.

While we are aware that various changes may be made in certain details of construction of the present invention as herein shown and described, we do not intend to limit the invention to the exact details illustrated, but only insofar as defined by the scope and spirit of the appended claims.

We claim:

1. In a transmission, a splined shaft, a clutch gear axially movable thereon, a pair of gears journalled on said shaft adjacent opposite ends of said clutch gear and having clutch tooth portions adapted to be selectively engaged by said clutch gear, a plurality of radially extending fingers on said clutch gear, a clutch yoke secured to the ends of said fingers and encircling said clutch gear, a synchronizer sleeve encircling said clutch gear within said yoke and having circumferential notches in the surface thereof, and wire springs carried in said yoke and engaging in said notches for coupling said yoke and sleeve for conjoint axial movement.

2. A synchronizer comprising a clutch gear having axially spaced tooth portions, radial arms extending from said gear intermediate said tooth portions, a synchronizer sleeve radially encircling said gear and having transverse openings therein receiving the ends of said arms, a clutch yoke assembly comprising three discs pressed together and radially encircling said sleeve, rivet means securing said assembly on the ends of said arms, the inner edge of the center disc being relieved intermediate said arms, and spring means carried in the relieved portions of said assembly and having detent engagement with the surface of said sleeve intermediate said arms.

3. The synchronizer of claim 2 further characterized in that said sleeve has circumferentially extending external grooves in the midplane thereof forming recesses for receiving portions of said spring means in said detent engagement.

4. A synchronizer comprising a clutch gear including axially spaced tooth portions and a series of radially extending arms therebetween, a synchronizer sleeve radially encircling said gear and having transverse openings receiving said arms, a yoke assembly encircling said sleeve and secured to the ends of said arms and having radially inwardly directed circumferential recesses intermediate said arms, and wire spring means between said assembly and said sleeve intermediate aid arms anchored at the ends in said recesses and having intermediate portions engaging said sleeve for resiliently coupling said yoke and sleeve for conjoint axial movement.

5. A synchronizer comprising a clutch gear having radially projecting arms, a synchronizer sleeve radially encircling said gear and having transverse openings receiving said arms and accommodating relative axial movement therebetween, a yoke encircling said sleeve and secured to said arms against relative circumferential or axial movement, said yoke having radially inwardly opening circumferentially extending recesses intermediate said arms, circumferentially extending detent notches formed in the surface of said sleeve in alinement with said recesses, and wire springs anchored at the ends in said recesses and having inwardly bent intermediate portions engaging in said notches.

6. A synchronizer comprising a clutch gear having radially projecting arms, a synchronizer sleeve having transverse openings therein receiving said arms, an independent encircling yoke about said sleeve and radially spaced therefrom, said yoke and arms having alined means defining therebetween transverse circular openings, rigid means in said opening, securing said yoke to the ends of said arms, and spring detent means between said yoke and sleeve normally restraining relative axial movement therebetween and centering said sleeve coaxially in said yoke.

7. A synchronizer comprising a clutch member having axially spaced clutch teeth portions, a coplanar series of integral radially extending arms intermediate said portions, a synchronizer sleeve of a length greater than said clutch member radially encircling the same and having means therein through which said arms freely extend to accommodate axial movement of said clutch member relative thereto, a yoke encircling said sleeve and rigidly secured to said arms, circumferentially extending wire spring detents anchored at the ends in the connection between said yoke and arms and engaging said sleeve intermediate said arms, and means in said sleeve preventing axial movement of said clutch member with respect thereto so long as there is relative rotation therebetween.

8. In a transmission having a shaft having a splined portion, a pair of axially spaced gears journalled on said shaft with said splined portion therebetween, a clutch member axially slidable on said splined portion and having clutch tooth portions at opposite ends thereof adapted to have selective clutching engagement with corresponding portions of said gears, a plurality of radial arms projecting from said clutch member and having arcuate transverse recesses in the ends thereof, a synchronizer sleeve radially encircling said clutch member and having transverse openings receiving said arms, a yoke encircling said sleeve and having corresponding arcuate recesses in alinement with said arm recesses, rivet means extending transversely therethrough for securing said yoke to the ends of said arms for axially shifting said clutch member, and spring detent means between said yoke and sleeve.

9. The transmission of claim 8 further characterized in that said yoke has radially inwardly opening arcuate recesses therein intermediate said arms providing housings for said detent means.

10. The transmission of claim 8 further characterized in that said detent means includes substantially arcuate wire springs having the ends thereof housed in said yoke adjacent said arms and having instruck intermediate portions engaging said sleeve.

11. A clutch gear and yoke assembly comprising a clutch gear having radially extending coplanar arms having transverse semi-cylindrical recesses in the outer ends thereof, a yoke encircling said arms and having corresponding recesses alined with said arm recesses, and rivet means in said recesses securing said yoke and clutch gear together for conjoint rotative and axial movement.

12. The assembly of claim 11 further characterized in arcuate channel-shaped recesses in said yoke intermediate said arms adapted to receive spring detent means for biasing a synchronizer sleeve in position between said gear and yoke.

13. A double synchronizing clutch including a jaw clutch member having radially extending fingers, a synchronizer sleeve having circumferentially spaced transverse openings through which said fingers extend, a yoke secured to said finger ends surrounding said sleeve and having circumferentially extending radially inwardly directed channel portions intermediate said sleeve openings, and wire spring means disposed in said channel portions and engaging the outer surface of said sleeve to provide conjoint movement therebetween.

14. A double synchronizing clutch comprising a jaw clutch member having radially extending fingers, a synchronizer sleeve encircling said member and having transverse openings through which said fingers extend, said sleeve having an external circumferential groove on the portions thereof intermediate said openings, a yoke encircling said sleeve and having inwardly directed channel portions overlying said groove, and circumferentially extending spring means disposed in said channel portions and groove and biased between said yoke and sleeve to resiliently couple them for conjoint axial movement.

15. In combination, a shaft having axially spaced gears thereon each having a friction surface, said shaft being splined between said gears, a synchronizer sleeve having friction surfaces at opposite ends thereof selectively engageable with said gear surfaces, a shifter yoke surrounding said sleeve, circumferentially extending wire springs carried in said yoke and engaging said sleeve to resiliently couple said yoke and sleeve for conjoint axial movement, and a jaw clutch member on said splined shaft portion having radial fingers extending through transverse openings in said sleeve, and transverse pin means in said openings rigidly coupling said yoke and clutch member for conjoint axial and rotative movement.

LEO A. BIXBY.
ROBERT LAPSLEY.